Jan. 9, 1951 G. E. FORSBERG 2,537,884
WIRE STRIPING MACHINE
Filed Nov. 4, 1947 2 Sheets-Sheet 1
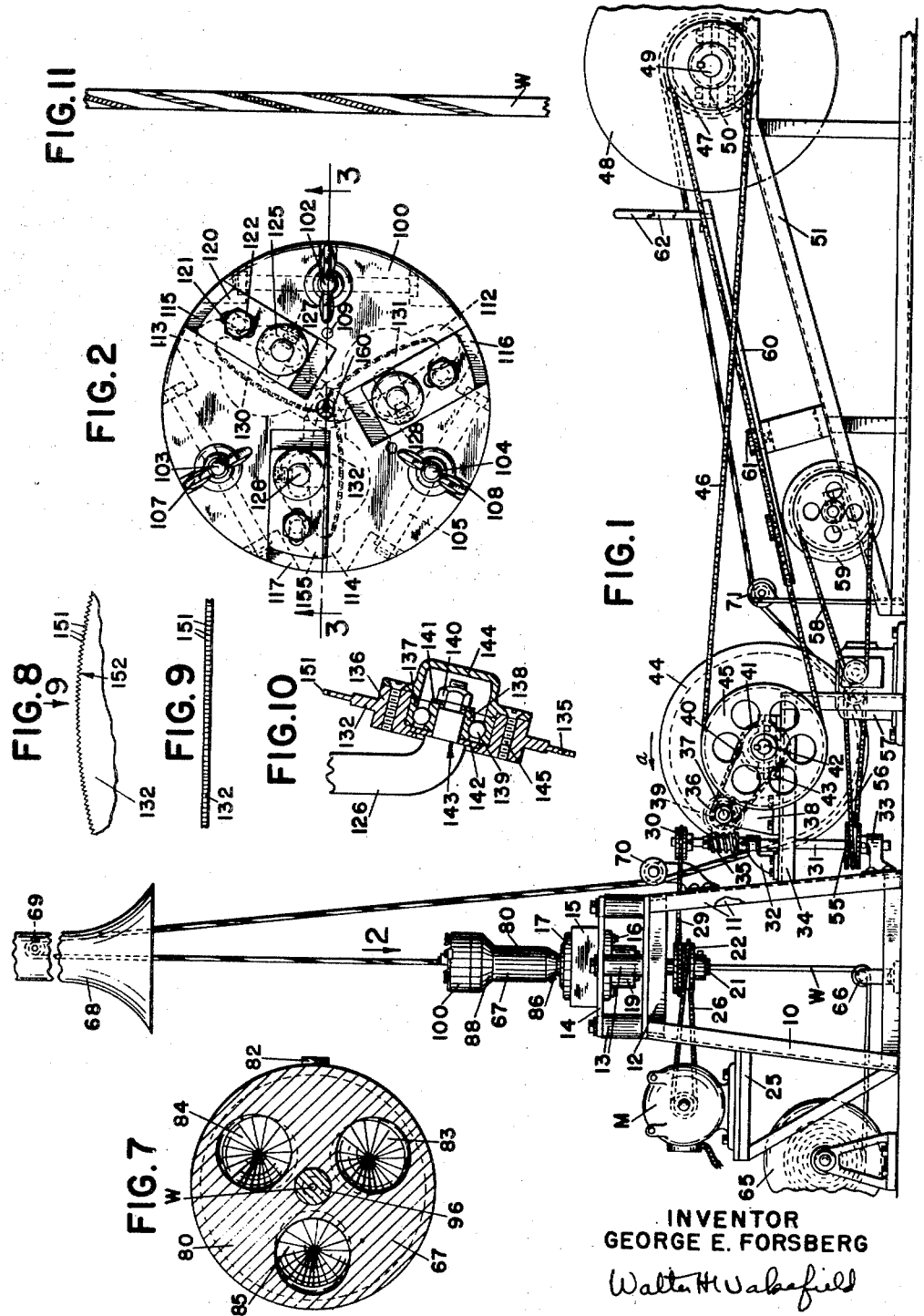
INVENTOR
GEORGE E. FORSBERG
Walter H. Wakefield
ATTORNEY Jan. 9, 1951　　　　　　G. E. FORSBERG　　　　　2,537,884
WIRE STRIPING MACHINE
Filed Nov. 4, 1947　　　　　　　　　　　　　　2 Sheets-Sheet 2
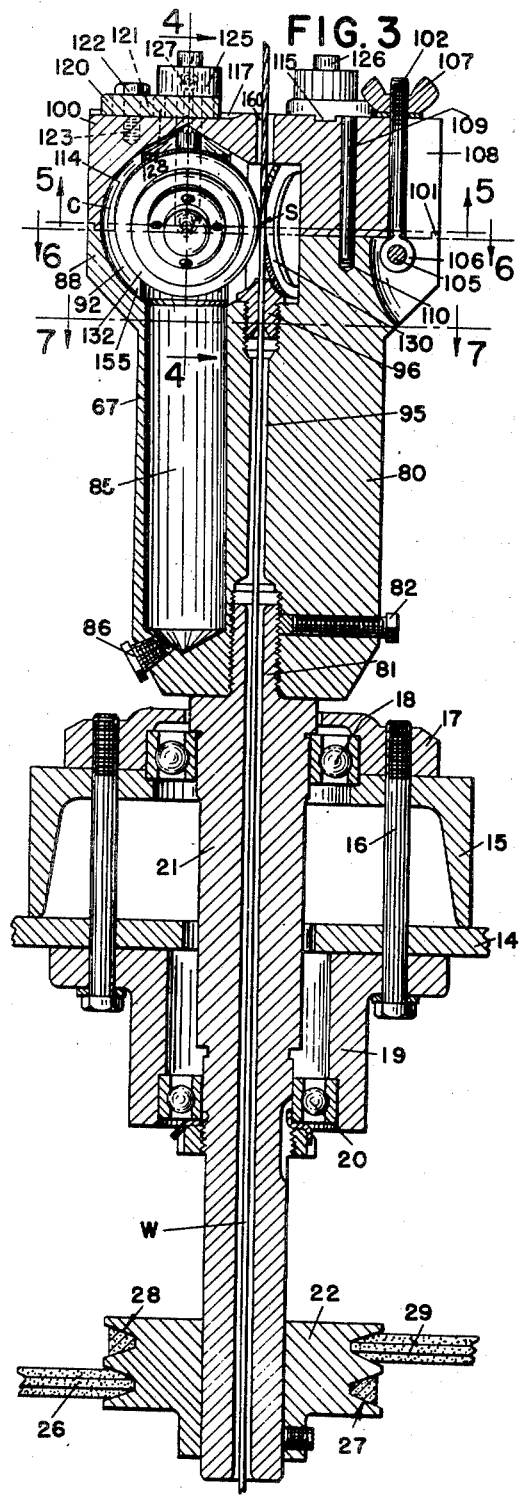
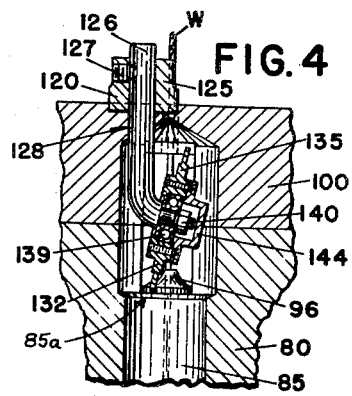
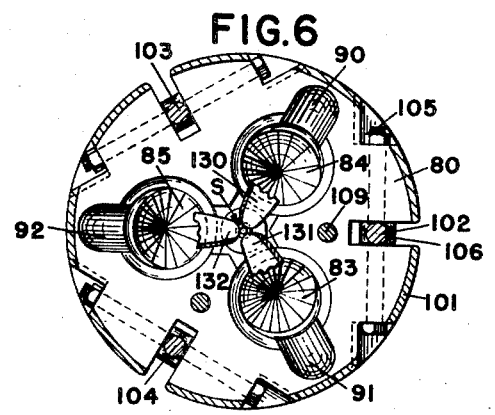
INVENTOR
GEORGE E. FORSBERG
Walter H Wakefield
ATTORNEY Patented Jan. 9, 1951

2,537,884

UNITED STATES PATENT OFFICE 2,537,884

WIRE STRIPING MACHINE

George E. Forsberg, Worcester, Mass., assignor to Surprenant Electrical Insulation Company, Clinton, Mass., a corporation of Massachusetts Application November 4, 1947, Serial No. 784,025

16 Claims. (Cl. 91—12)

This invention relates to improvements in striping machines for wire and the like and it is the general object of the invention to provide a machine wherein several simultaneous striping operations may be rapidly and efficiently performed on a wire.

For purposes of identification it is essential that electric wires carry different kinds of identifying marks or stripes so that they may be readily distinguished from each other either in a cable or apparatus in which they are used. In the past identification has been by means of a colored thread in the braided covering of the wire insulation, but the means of applying such identification is slow in operation and adds thickness to the wire.

It is an important object of my present invention to provide a machine which will apply one or more distinguishing stripes directly to the insulation of a wire passing through the machine in such manner as to have the identification integrated with the insulation without adding to its thickness.

It is another object of the invention to cause the wire which moves through the striping machine to rotate or otherwise move striping means which are revolving about the wire, thereby eliminating gearing or similar drive means for the striping means.

It is a still further object of the invention to provide a rotatable striping unit wherein the ink or other striping fluid, such as a dye or pigment, is held by centrifugal force away from the wire being striped but in position to ink the striping means revolving around the wire. In this way it is possible to use a plurality of different colors without danger of mixing even though the inking chambers or cavities carrying the differently colored inks are in communication with each other.

It is another object of the invention to provide the rotating striping unit with ink wells below the striping means and locate the latter in chambers communicating with the wells in such manner that rotation of the striping unit causes the inks to rise from their wells into corresponding chambers to ink the various striping means. The different inks remain in their respective wells while the machine is at rest, but when the unit rotates the inks rise from their well and then return to the wells when the machine slows down without mixing or splashing on the wire.

It is desirable that the wire be held centrally with respect to the various striping means, such as rotatable disks, so that the stripes of different colors may be uniformly distributed around the periphery of the wire. It is another object of the invention to provide striping disks or the like which engage the wire at different points around its circumference and center it with respect to the axis of the striping machine.

It is a still further object of the invention to provide a common source of power for simultaneously drawing the wire through the striping unit and rotating the latter to produce spiral stripings which will be uniformly spaced even though there should be some variation in the rate at which the striping unit turns, as at the start and end of operations.

With these and other objects in view which will appear as the description proceeds, my invention resides in the combination and arrangement of parts hereinafter described and set forth.

In the accompanying drawings, wherein a convenient embodiment of my invention is set forth, Fig. 1 is a front elevation of a striping machine made according to my present invention, Fig. 2 is an enlarged plan view looking in the direction of arrow 2, showing the top of the striping unit, Fig. 3 is a vertical section on line 3—3 of Fig. 2, Fig. 4 is a vertical section on line 4—4 of Fig. 3 showing the details of one of the striping disks and its mounting, Figs. 5, 6 and 7 are horizontal sections on lines 5—5, 6—6 and 7—7, respectively, of Fig. 3, looking in the directions of the arrows, Fig. 8 is an enlarged detailed elevation showing part of one of the striping disks, Fig. 9 is a view looking in the direction of arrow 9, Fig. 8, Fig. 10 is an enlarged view of the striping disk and mounting shown in Fig. 4, and Fig. 11 is an enlarged view of a wire striped by the machine forming the subject matter of this invention.

Referring generally to Fig. 1, the machine comprises a source of unstriped wire, a striping unit, a drying chamber, feed means to draw the wire through the striping unit, a wind-up roll on which the striped wire is wrapped, and a motor driving the several parts of the machine.

More particularly, a frame 10 suitably supported on legs 11 has a table 12 provided with uprights 13 which support a plate 14. As shown more particularly in Fig. 3 a hollow block 15 is bolted to the plate as at 16 and supports a bearing member 17 for a roller bearing 18. Depending from the plate 14 is a second bearing member 19 with a second roller bearing 20. A shaft 21 is supported by the roller bearings and has secured to the lower end thereof a pulley 22 by means of which the shaft can be rotated.

A bracket 25 extending from the left side of the frame as viewed in Fig. 1 supports a motor M driving a belt 26 fitting the lower groove 27 of pulley 22. The upper groove 28 of pulley 22 receives a second belt 29 which extends to the right as viewed in Fig. 1 to a pulley 30 secured to the upper end of an upright shaft 31 guided in top and bottom bearings 32 and 33, respectively. The latter bearing may be secured directly to one of the legs 11 of the frame 10, while the bearing 32 is mounted on a shelf 34 which may be connected rigidly to the frame 10.

Upright shaft 31 is provided with a worm 35 which meshes with a worm wheel 36 on a horizontal shaft 37 rotatable in a bearing 38 secured to the shelf 34. A sprocket wheel 39 is secured to shaft 37 and by means of a chain 40 drives a second sprocket wheel 41 secured to a second horizontal shaft 42. This latter shaft turns in a bearing 43 secured to the shelf 34 and has secured thereto a feed drum 44. A driving pulley 45 also secured to shaft 42 is connected by a crossed belt 46 to a pulley 47 by means of which a wind-up reel 48 is turned. Pulley 47 and reel 48 are both secured to a shaft 49 rotatable in a bearing 50 mounted on a frame 51 extending to the right as shown in Fig. 1.

The lower end of shaft 31 has secured thereto a pulley 55 which by means of a belt 56 drives a speed reducing unit 57 connected by a belt 58 to a barrel cam 59 which when turning oscillates a lever 60 pivoted at 61 on the frame 51. The right end of lever 60 as viewed in Fig. 1 has guide pins 62 which rock back and forth lengthwise of the reel 48 during operation of the machine.

The wire W or the like to be striped is drawn from a supply drum 65 and extends around a bottom guide pulley 66 and then upwardly through shaft 21 and the striping unit 67 to be described in detail hereinafter. From unit 67 the wire extends upwardly through a heating chamber 68 provided with a guide pulley 69 and then extends down around a small guide pulley 70 and is wrapped around the feed drum 44 to have close frictional contact therewith. From drum 44 the wire extends over another guide pulley 71 and thence through the guide pins 62 to the wind-up reel 48. The details of the driving connection between the pulley 47 and reel 48 are not shown but they will ordinarily include some form of compensating slip friction feed which will accommodate itself to the increasing diameter of the wire as the latter is wrapped on the reel.

In the operation of the matter thus far described rotation of motor M causes shaft 21 to rotate in its bearings and also causes the feed drum 44 to turn in the direction of arrow $a$, Fig. 1, to draw the wire W through the striping unit 67. The connections between shaft 21 and drum 44 are such that they will always move at the same proportionate rate even though there should be variations in the speed of the motor.

The rotatable striping unit 67 is shown more particularly in Figs. 2 to 7 and briefly includes ink wells or reservoirs communicating at their upper ends with inclosed inking chambers in which are located striping disks mounted for engagement with the wire W. The wells and disks revolve around the wire as it moves upwardly.

In greater detail, the striping unit 67 comprises a base 80 which is held to the upwardly extending threaded stem 81 of shaft 21 by set screw 82. This base 80 is provided with three ink wells 83, 84 and 85 the axes of which may be slightly oblique and inclined downwardly and toward the axis of shaft 21. These wells hold the striping agents, which may be inks or other striping fluids. A plug 86 at the lower end of each well affords means by which it can be cleaned out when it is desired to change from one color ink to another color.

The upper end of the base 80 is of enlarged diameter as at 88 and is formed with three recesses 90, 91 and 92 which extend more or less radially from the axis of rotation of the striping unit and the wire W. These three recesses are in communication with each other and each communicates with its own ink well.

The base 80 is provided with a central bore 95 somewhat larger than the largest size of wire which the machine can accommodate and a guide 96 tapped in the upper part of the base section 80 serves to guide the wire as it moves upwardly. The guide 96 is only one of several with which the machine will be supplied to accommodate wires of different diameters.

The top or head of the striping unit is indicated at 100 and is centered on the base 80 by means of a circular rib 101 formed on the latter. The head is held tightly in position by means of three tie bolts 102, 103 and 104 each of which is pivoted on an anchor bolt 105 mounted on the base 80, as shown for instance in Fig. 6. The bolts 102, 103 and 104 have eyes 106 at their lower ends for their respective bolts 105, and wing nuts or the like indicated at 107 afford means for clamping the head 100 to the base 80. When it is desired to remove the head the wing nuts are loosened and the tie bolts are swung outwardly from their slots 108, after which the head 100 can be raised. Two positioning pins 109 secured to the head fit into corresponding holes 110 in base 80.

As shown in Fig. 5 the head 100 is formed with recesses 112, 113 and 114 extending radially from the axis of the head and registering with their corresponding recesses in the upper end of base section 80. The registering pairs of top and bottom recesses in the head 100 and base 80 form communicating inking chambers or cavities C radiating from the wire. The upper ends or mouths of the wells 83—85 may be considered as passages between the wells and their corresponding cavities or inking pockets. One of these mouths or passages is indicated at 85a in Fig. 4.

As seen in Fig. 2 the top of head 100 is provided with three upwardly opening slots 115, 116 and 117 which are equally spaced angularly around the axis of the striping unit. Each of these slots receives a block 120 having a slot 121 receiving a screw 122 which is tapped into the head as at 123. By means of the screws 122 the blocks can be moved along their slots to occupy different distances from the axis of rotation to accommodate wires of diffeernt sizes.

Formed with each block is a hub 125 through which extends the upper end of a stem or rod 126 held in angularly adjusted position on the hub by a set screw 127. This stem extends down through a slot 128 in head 100 under the block and into the inking chamber therebelow to support a striping disk. These disks or striping rollers are indicated at 130, 131 and 132 and are all alike and mounted as shown in Figs. 4 and 10.

As shown in Fig. 10, wherein one of the disks or rollers 132 is set forth in detail, the thin web or disk plate 135 is formed with a ring 136 which receives an outer bearing shell 137. This shell together with inner shell 138 and balls 139 form a ball bearing mounting of very low frictional resistance which permits the disk to be turned easily by contact with the wire when the latter moves through the striping unit 67.

The lower end of the stem or disk supporting means 126 is bent as shown in Figs. 4 and 10 and has a reduced threaded end receiving nut 140 which forces a washer 141 against the inner shell 138 of the ball bearing. The opposite side of shell 138 is held against a washer 142 which in turn is forced against a shoulder 143 on the stem 128 by the nut 148. The washer is a convenient means for keeping ink away from the left hand side of the ball bearing as shown in Fig. 10. The right hand side of the ball bearing is protected by a guard or case 144 held to the ring 136 by screws 145. The case 144 also engages the outer ball bearing shell 137. The lower ends of stems 126 are preferably inclined downwardly to dispose the disks obliquely with respect to the axis of the striping unit.

The peripheries of the disks are preferably provided with fine transverse grooves 151 which may be produced by a knurling operation, see Fig. 8. These grooves are separated by ridges or teeth 152 which are the parts of the disks which have actual contact with the wire.

Preparatory to operation the striping unit head 100 will be removed and ink will be poured into the several wells up to the bottoms of the chambers C. Unstriped wire will be pushed upwardly through the hollow shaft 21 and the guide 96 and then passed through hole 160 in head 100. The head is then fitted to the base and clamped in place by the tie bolts and wing nuts. The wire is then led up through the drying chamber and brought down and wrapped around feed drum 44 and attached to the wind-up reel. Depending upon the size of the wire the disks will be adjusted by manipulation of their supporting blocks to have tangential contact with the wire sufficient to cause the disks to turn as the wire moves upwardly through the striping means.

After these preparations are completed the motor is started and will cause the drum 44 to draw the wire upwardly through the striping unit 67 and will also cause the latter to rotate about the wire. As the speed of the motor increases and approaches its normal operating rate, centrifugal force will cause the inks in the wells to rise into the outer part of their respective inking chambers. These outer parts of the chambers may be considered as pockets 155 in which the ink will be held by centrifugal force in sufficient volume to wet or ink the outer parts of the disks. As the latter are rotated by rolling frictional peripheral driving engagement with the moving wire the ink on the disks will be deposited on the wire to form helical stripes. Centrifugal force will cause the sides of the striping disks or rolls to shed excess ink, but the grooves will be able to hold ink. It is to be understood that the teeth 152 are very narrow and the effect of the disks rolling along the wire is to produce continuous stripes of uniform width and sharp definition.

The ink is preferably made of material similar to the insulation of the wire dissolved in a solvent which when the ink is applied to the wire insulation penetrates the latter and incorporates the colored stripe integrally with the insulation. For instance, when the insulation is a white plastic, as vinyl chloride, the ink may be a solution of a colored vinyl chloride dissolved in methyl ethyl ketone. I do not wish to be limited in the use of the machine described herein to this particular kind of ink or insulation, since the machine will operate satisfactorily with a variety of fluid inks and insulations. Other examples of suitable plastics are vinyl copolymere and polyethylene. The wire shown in Fig. 11 has a white insulation and is striped in red, green and black, but obviously other color combinations can be used. In this connection it may be mentioned that the word ink used herein is employed generically to include dyes, pigments, or any liquid material which when deposited on the insulation will either adhere to it or become incorporated with it.

As the wire rises from the guide 96 it should be kept in line with the axis of the striping unit to prevent whipping or vibration. This result is accomplished by engagement of the three disks or rollers with the wire at three substantially equally spaced points around its periphery so that the wire may be centered relatively to the striping unit.

In practice I have found that a machine as set forth herein can operate at a high speed and the stripes will be clearly defined. The inks in the inking chambers do not flow together despite the fact that the striping station S determined by the contact between the disks and the wire may be below the level of the ink of the chambers.

When the striping operation is completed the motor will be stopped but will run sufficiently long after power is cut off to permit the striping unit to come to rest gradualy. As the striping unit slows down the inks will flow by gravity from the outer ends of their inking chambers and pockets back to their wells without wetting the wire. In this connection each well may be considered an opening in the unit below its pocket through which the ink drains by gravity out of the pocket as the machine slows down and stops after operation thereof.

Although the machine has been described in connection with helical striping of electric wire coated with a plastic insulation, it is not limited to such uses, and the word wire used herein is employed in a general sense and applies to any elongated article which can be passed through the striping unit. Thus, the machine may be employed for striping tubes, cords, lines and the like. It should also be borne in mind that if a particular wire is to have a single stripe two of the wells will be left empty of ink, and one well can be left empty if only two stripes are required. Even though certain of the disks may not be striping the wire they will center it with respect to the striping unit.

In Fig. 4 the plane of the disk is shown as oblique with respect to the wire and the axis of the striping unit. This setting assists the disks in forming helical stripes with well defined edges, but I have found as a matter of practical experience that the obliquity of the planes of the disks may be somewhat more or less than that indicated in Fig. 4 without material effect on the character of the stripe produced.

From the foregoing it will be seen that I have provided a simple form of wire striping machine wherein the wire to be striped passes axially through a striping unit which revolves about the wire and causes striping means such as disks to revolve around the wire as they are rotated by the wire. Furthermore, rotation of the striping unit causes ink to rise from the wells into the outer parts of the inking chambers where it is spaced from the wire so that the latter never receives any ink except that deposited upon it by the disks despite the fact that the inking chambers communicate with each other and radiate from the wire and striping station. Also, the three disks by their engagement with the wire and the adjustments which are afforded by the blocks 128 center the wire and hold it against whipping or lateral vibration as the striping unit 67 rotates about it. At the end of a striping operation the gradual slowing down of the striping unit permits the inks to return by gravity to their wells without wetting or in any other way marring the wire, and for this reason the entire length of the wire will be properly striped. The single motor drives feed drum 44 and the striping unit 67 simultaneously and at a fixed ratio of speeds so that wire produced while the striping unit is speeding up or slowing down will have helical stripes of the same lead as those produced when the machine is operating at full speed.

Having thus described my invention it will be seen that changes and modifications may be made therein by those skilled in the art without departing from the spirit and scope of the invention and I do not wish to be limited to the details herein disclosed, but what I claim is:

1. In a striping machine, mechanism moving a wire to be striped vertically through the machine, a striping unit having therein a cavity radiating from the wire, means rotating the unit around the wire to cause fluid ink in the cavity to be held spaced from the wire by centrifugal force due to rotation of the unit, and a striping roller rotatably mounted on the unit in the cavity partly immersed in the ink and revolved about the wire by the unit and having rolling engagement with the wire and turned by the latter due to said rolling engagement and vertical movement of the wire to move ink onto the wire to stripe the latter.

2. In a striping machine for a wire and the like, a striping unit rotatable about a vertical axis, mechanism moving a wire along said axis, the unit having an ink well therein communicating with a recess therein above the well, the recess radiating horizontally from the axis, a striping roller on the unit in the recess having rolling engagement with and rotated by the moving wire, the striping unit when rotating revolving the roller around the wire and causing ink to rise by centrifugal force from the well into a part of the recess spaced horizontally from the wire to ink the roller, and means to rotate the unit, the ink moving down from the recess into the well without wetting the wire when the unit comes to rest gradually after rotation thereof.

3. In a striping machine, mechanism moving a wire vertically through a striping station, means rotatable about the wire defining a well for containing fluid ink below the station and having an inking chamber above the well, the inking chamber communicating with the well and radiating from the station, roller striping means on the rotatable means in said inking chamber engaging the moving wire and revolved about the latter when the rotatable means rotates and effective when inked to mark the wire at said station, and driving means to rotate said rotatable means and cause ink to rise by centrifugal force from the well to the outer part only of the chamber spaced from said station to ink the roller striping means.

4. In a striping machine, mechanism moving a wire vertically through a striping station, means rotatable about the wire having therein a well below the station for containing fluid ink and an inking chamber above the well communicating therewith and with the striping station, a striping roller in said inking chamber rotatable on the rotatable means and inked when ink is in the chamber and having the periphery thereof in rolling engagement with the wire, the latter due to motion thereof and said engagement turning the roller to stripe the wire at the station, and driving means rotating the rotatable means and causing ink to rise from the well into the chamber by centrifugal force and ink the roller.

5. In a striping machine, a striping unit rotatable about a vertical axis comprising a base and a head, means moving a wire through said base and head along the axis of the unit, the base having an ink well therein and the base and head having registering recesses which jointly form an inclosed chamber above and communicating with the well and radiating from the axis of the unit, means holding the head to the base, a striping roller in said chamber supported by the unit and having rolling engagement with the wire and rotated by the latter due to movement thereof through the base and head, and means to rotate the base to cause ink in the well to rise into the chamber to ink the roller and remain radially spaced from the wire due to centrifugal force as the base and head rotate.

6. In a striping machine, a striping unit rotatable about a vertical axis comprising a base and a head, means moving a wire through said base and head along the axis of the unit, an ink well in the base, an inclosed chamber within the striping unit radiating from said axis above and communicating with the well, a striping roller in the chamber supported by the head and having rolling engagement with and rotated by the wire due to movement of the latter along said axis, detachable means normally holding the head to the base which when detached permits upward removal of the head and striping roller for replenishment of ink in the well, and means to rotate the base and cause ink in the well to rise into the chamber by centrifugal force to ink the striping roller.

7. In a striping machine having a vertical axis, mechanism moving a wire along the axis of the machine, a striping unit rotatable about said axis and the wire and having three ink pockets communicating with each other adjacent to said axis and radiating from said axis, the parts of said pockets remote from the axis being separated from each other, means rotating said unit about said axis and causing ink in said pockets to be held spaced from the axis in said parts of the pockets by centrifugal force due to rotation of said unit, and a striping roller in each pocket extending into said remote part thereof rotatably mounted on the unit and revolved around the wire by the unit and having rolling engagement with the moving wire and turned thereby to convey ink from the associated pocket to the wire to stripe the latter, said rollers being distributed around and engaging the wire at three substantially equiangularly spaced points in the same horizontal plane and by engagement with the wire holding the latter on said axis.

8. In a striping machine, mechanism moving a wire to be striped vertically through the machine, a striping unit rotatable about the wire and having an inking chamber radiating from the wire, the unit having an ink passage below the chamber communicating with the latter, means rotating the unit to cause ink in the chamber to be held horizontally spaced from the wire by centrifugal force due to rotation of the unit, and a striping roller in the chamber partly immersed in the ink in the chamber when the unit is rotating, said roller being rotatably mounted on the unit and revolved about the wire by the unit and having rolling engagement with the wire, the roller extending from the ink in the chamber to the wire and when moved by the wire due to movement of the latter and said rolling engagement therewith producing a helical stripe on the wire, ink in the chamber moving downwardly through said passage and away from the roller when the unit comes to rest after rotation thereof.

9. In a striping machine, a striping unit rotatable about a vertical axis and having a cavity therein radiating from the axis, mechanism moving a wire to be striped along the axis of rotation of the unit, means rotating the unit about the axis thereof and the wire and causing fluid ink in the cavity to be held spaced from the wire by centrifugal force, a bearing in said cavity supported by the unit and spaced from the wire, and a striping roller mounted for rotation on said bearing in said cavity and revolved about the wire by said unit, said roller having the periphery thereof in driving engagement with the wire and partly immersed in the ink, the wire due to said driving engagement effective when moved by said mechanism to turn the roller to cause the inked periphery thereof to produce a stripe on the wire.

10. In a striping machine, a hollow striping unit mounted for rotation about a vertical axis and having an ink well therein, mechanism moving a wire to be striped along the axis of the unit, a striping roller mounted for rotation on the unit above said well, means rotating the unit about said axis and causing ink in said well to rise from the well to ink said roller and be held spaced from the wire by centrifugal force, said means causing the roller to revolve around the wire, said roller directly engaging the wire in driving relation therewith and rotated by the wire due to vertical movement of the latter to produce a stripe thereon, the ink returning to the well by gravity to a position below and spaced from the roller when the unit comes to rest after rotation thereof.

11. In a wire striping machine, a striping unit rotating about a vertical axis, means rotating the unit about said axis, mechanism moving a wire to be striped along said axis, a striping roller mounted on the unit for rotation relative thereto and revolved by the unit around the wire, and said unit having an ink pocket therein radiating horizontally away from said axis and in which the roller is located, centrifugal force due to rotation of the unit holding fluid ink in the pocket spaced from said axis and that part of the roller remote from the axis being immersed in the ink, the periphery of the roller engaging the wire and the latter due to movement therof along said axis rotating the roller as the unit rotates to cause the roller to produce a spiral stripe on the wire.

12. The striping machine set forth in claim 11, wherein said roller has transverse grooves in the periphery thereof to hold the ink against the action of centrifugal force as the unit rotates.

13. In a wire striping machine, a striping unit rotatable about a vertical axis, mechanism moving a wire to be striped along said axis, the unit having an ink pocket radiating from the axis, a striping roller mounted for rotation on the unit having peripheral rolling engagement with the wire when the latter is moving and extending from the wire into said pocket, and means to rotate the unit about said axis, centrifugal force due to rotation of the unit by said means holding fluid ink in said pocket spaced from the wire and the moving wire rotating the roller to turn the periphery thereof through the ink and turn the inked periphery of the roller toward and into engagement with the wire as the unit rotates to produce a helical stripe on the wire.

14. In a machine for striping wires and the like spirally, the combination of means for moving a wire vertically in the direction of its length, a head rotatable about the wire and having an inking pocket therein radiating from the wire, means rotating the head about the wire, an inking roller in said pocket mounted for rotation on the head and having rolling contact with the moving wire, an ink well in the head below the pocket, and the head having a passage from the ink well to the pocket through which ink is fed by centrifugal force into the pocket to ink the roller upon rotation of the head.

15. In a machine for striping wire and the like, the combination of means for moving a wire vertically, a unit rotatable about the wire, means rotating the unit about the wire, an inking roller mounted for rotation on the unit and having peripheral engagement with the moving wire, an ink well supported by the unit, and the unit having a passage through which ink in the well is forced to the periphery of the roller by centrifugal force upon rotation of the unit.

16. In a striping machine having a vertical axis, mechanism moving a wire to be striped along said axis, a striping unit mounted on the machine for rotation about said axis, a plurality of at least three striping rollers arranged around said axis rotatably mounted on the unit and revolved around the wire by the unit when the latter rotates and having rolling engagement with the wire, the angular distance from any roller to the roller on either side thereof measured around said axis being less than 180 degrees, said unit having therein radiating from said axis an ink pocket for each roller into which the latter extends, and means rotating the unit around said axis and causing ink in the pockets to be held spaced from said axis by centrifugal force, each roller being partly immersed in the ink in the corresponding pocket when the unit is rotating, the wire due to said rolling engagement and movement thereof along said axis rotating the rollers and causing the latter to produce stripes on the wire, said rollers engaging the wire at spaced points therearound and at the same position along the length of the wire to hold the wire centered on said axis and simultaneously produce said stripes at said position.

GEORGE E. FORSBERG.

REFERENCES CITED

The following references are of record in the file of this patent:

UNITED STATES PATENTS

| Number | Name | Date |
| --- | --- | --- |
| 1,339,184 | Firsching | May 4, 1920 |
| 1,956,951 | Hinsky | May 1, 1934 |
| 2,344,610 | Hargreaves et al. | Mar. 21, 1944 |
| 2,425,266 | Robbins | Aug. 5, 1947 |